J. SHEEDY.
Gas Stove.
No. 101,928.
Patented April 12, 1870.
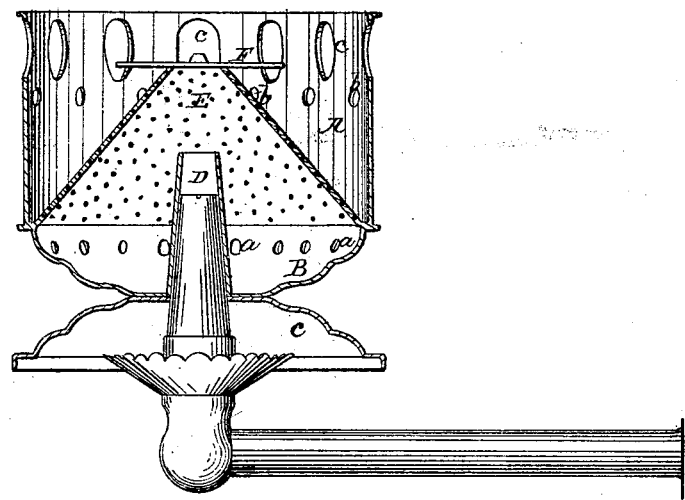
Witnesses
Inventor
James Sheedy

United States Patent Office.

JAMES SHEEDY, OF NEW YORK, N. Y.

Letters Patent No. 101,928, dated April 12, 1870.

IMPROVEMENT IN GAS-HEATERS.

The Schedule referred to in these Letters Patent and making part of the same

*To all whom it may concern:*

Be it known that I, JAMES SHEEDY, of the city, county, and State of New York, have invented a new and useful Improvement in Heaters for Gas-Burners, of which the following is a full, clear, and exact description, reference being had to the accompanying drawing forming part of this specification, which represents a sectional elevation of my improved heater as applied to a gas-burner.

My improvement in heaters for gas-burners consists in a peculiar construction and novel combination of parts, including a perforated conical distributer, mounted by a disk that operates as a spreader, and projection of the burner, or socket by which the heater rests on the latter, up within the conical distributer, or above the base portion of the body of the heater, whereby a better heating effect is produced, and escape or ignition of the gas within or below said base portion is prevented, which facilitates the handling of the heater by reason of the coolness of its base.

Referring to the accompanying drawing—

A represents the upper, and B, the lower portion of the body of the heater, such lower portion including a stand portion, C, carrying a socket, D, which serves to support the heater on the burner, and which is arranged to project up within the lower portion of the body of the heater, so that the gas, as it issues from the burner, is excluded from collecting or igniting within the lower portion of the heater, and is caused to pass directly into the upper part thereof, within a perforated conical distributer, E, to the flame, arranged within the upper portion A.

The lower portion B has draught-openings $a$ in it for admission of air, and the upper portion A also openings $b$ and $c$, which latter, or the top ones $c$, serve to allow of the escape of the flame to play under the overhanging portion of the sauce-pan or other vessel resting upon the top of the heater.

The lower perforations in the conical distributer E, likewise operate as draught-openings to the flame.

To secure a yet more perfect distribution of the ignited gas, or spreading of the same, there is arranged on top of the conical distributer E a disk or spreader, F.

A heater thus constructed is not only very effective and economical, as regards the distribution and rapid application of the heat to the vessel resting upon it, but its lower portion remains cool, so that it may at all times be conveniently handled by its base or stand C, and all escape or ignition of gas below the perforated conical distributer E is prevented.

What is here claimed, and desired to be secured by Letters Patent, is—

The combination and arrangement of the perforated conical distributer E and disk or spreader F within the upper portion A of the body of the heater, and relatively to the burner or socket D, by which the heater is supported on the burner, substantially as specified.

JAMES SHEEDY.

Witnesses:
JOHN D. ROSSET,
HENRY PALMER.